United States Patent [19]

Gallacher

[11] Patent Number: 4,900,358

[45] Date of Patent: Feb. 13, 1990

[54] WATER SOLUBLE CORROSION INHIBITING COMPOSITIONS AND PROTECTIVE COATINGS PREPARED THEREFROM

[75] Inventor: Lawrence V. Gallacher, Norwalk, Conn.

[73] Assignee: King Industries, Inc., Norwalk, Conn.

[21] Appl. No.: 175,067

[22] Filed: Mar. 30, 1988

[51] Int. Cl.$^4$ ............................................... C04B 9/02
[52] U.S. Cl. ................................ 106/14.13; 106/14.15
[58] Field of Search ........................... 106/14.13, 14.15; 252/34, 390, 391

[56] References Cited

U.S. PATENT DOCUMENTS

| | | | |
|---|---|---|---|
| 2,764,548 | 9/1956 | King et al. | 252/33 |
| 3,075,005 | 1/1963 | Carden et al. | 252/33 |
| 3,256,187 | 6/1966 | Davis | 252/34 |
| 4,395,286 | 7/1983 | Sturwold | 106/14.13 |

Primary Examiner—Theodore Morris
Attorney, Agent, or Firm—Hedman, Gibson, Costigan & Hoare

[57] ABSTRACT

Compositions comprising alkanolamine salts of alkylaromatic sulfonic acids, a half acid ester of an alkyl- or alkenylsuccinic acid and a liquid medium comprising predominantly water, and, optionally, sufficient excess alkanolamine to maintain true solubility in all proportions with water provide thin, continuous, clear protective coatings for metallic substrates normally susceptible to corrosion.

12 Claims, No Drawings

WATER SOLUBLE CORROSION INHIBITING COMPOSITIONS AND PROTECTIVE COATINGS PREPARED THEREFROM

This invention relates to corrosion inhibiting compositions comprising amine sulfonates and carboxylic acid half esters which are clear and miscible with water in all proportions and with metallic substrates protected from corrosion by having thereon a dry protective layer of such compositions.

BACKGROUND OF THE INVENTION

It is well known to combine sulfonates with carboxylic acid derivates to obtain synergistic behavior in inhibiting corrosion. It is also well known to use emulsions of such corrosion inhibiting compositions and to dilute them with water to provide protective coatings. However, it is not known how to make and use compositions of such ingredients in clear, totally water soluble compositions, i.e., free of emulsions and/or microdispersions, and to provide protective films from them which are strippable in conventional metal working cleaner solutions, while at the same time providing long term protection and the ability to withstand routine handling.

The above-mentioned emulsified compositions provide coatings with protective properties, but, as is a matter of common knowledge and experience, they must be quite thick, e.g., 1-5 mils thick, after drying, to produce reasonable protection. A totally soluble, true solution of such sulfonate compositions would represent a major advance because application and evaporation should leave a very thin film, e.g., 0.05 mils or less, and yet provide excellent protection because the film would be continuous and lack moisture-sensitive emulsifier residues.

It has now been discovered that amine sulfonates and carboxylic acid half esters, optionally including an alkanolamine, can be mixed with water in all proportions to give clear, true solutions. The solutions are true solutions and not emulsions, suspensions or inverted emulsions because they do not exhibit a Tyndall effect.

The compositions can be applied by spraying, dipping, and the like, to protect metal parts with a clear, uniform coating which dries rapidly to leave a nearly invisible non-tacky surface which provides extended protection against corrosion in high humidity conditions. At the same time the coatings are easily removed by stripping, e.g., with conventional alkaline cleaners, leaving chemically clean metallic surfaces.

SUMMARY OF THE INVENTION

According to the present invention there are provided compositions dilutable in all proportions with water to form a true solution and adapted to form clear corrosion-inhibiting coatings on metal substrates normally susceptible to corrosion, said compositions comprising:
(A) A salt of
(i) an alkylaromatic sulfonic acid and
(ii) an alkanolamine;
(B) A half acid ester of an alkyl- or alkenylsuccinic acid;
(C) an aqueous liquid diluent therefor; and, optionally,
(D) an effective amount to maintain miscibility of an alkanolamine which is the same as or different from that defined for (A)(ii).

Among the preferred features of the invention are compositions wherein the aqueous liquid (C) comprises water in a major proportion; compositions wherein component (i) comprises dinonylnaphthalene sulfonic acid, the nonyl radicals of which are highly branched; those wherein component (ii) comprises a monoalkanolamine, a dialkanolamine, a trialkanolamine, or a mixture of any of the foregoing, and especially wherein said trialkanolamine (ii) comprises triethanolamine. Special mention is made of triethanolamine salt of dinonylnaphthalene sulfonic acid (a 50% solution in polyglycol of said salt being available commercially from King Industries, Inc., Norwalk, Conn., U.S.A. under the trademark NA-SUL ® TEA-LB). Also among the preferred features of the invention are compositions as above defined wherein component (B) comprises a half acid $C_1$–$C_8$ ester of a $C_8$–$C_{20}$ alkyl- or alkenylsuccinic acid, especially those wherein component (B) comprises a half acid methyl ester of dodecenylsuccinic acid. Especially preferred are compositions wherein component (D) is present and comprises a monoalkanolamine, a dialkanolamine, a trialkanolamine or a mixture of any of the foregoing, especially those wherein component (D) comprises diethylethanolamine. The concentration of the individual components can vary broadly, but preferably, components (A), (B) and (D) comprise from about 2 to about 95 parts by weight per 100 parts by weight of (A), (B), (C) and (D) combined, and especially preferably components (A), (B) and (D) comprise from about 4 to about 35 parts by weight per 100 parts by weight of (A), (B), (C) and (D) combined.

The invention in a second major aspect also contemplates articles comprising a metallic substrate normally susceptible to corrosion and, on at least one portion of said substrate, a protective dry layer of a corrosion-inhibiting composition as defined above.

DETAILED DESCRIPTION OF THE INVENTION

The alkylaromatic sulfonic acids comprising component (i) can vary widely in chemical nature, so long as they have a minimum molecular weight of about 320. If a phenyl nucleus is present, these requirements can be met with a benzenesulfonic acid containing one or two alkyl groups having a total of at least about 12 carbon atoms, e.g., didodecylbenzenesulfonic acid. Instead of a phenyl nucleus, the aromatic nucleus can be polycyclic, e.g., naphthyl, anthracyl, phenanthryl, etc. Many variations in the position of substitution are possible and contemplated and mixed positional isomers are included. The alkyl substituents can be straight or branched chain. Best results are obtained with maximum variations in substituent locations and with maximum branching.

The most preferred alkylaromatic sulfonic acids are branched alkyl-substituted naphthalenesulfonic acids. These are available, for example, by sulfonating polyalkylnaphthalenes. The polyalkylnaphthalenes can be made by alkylating naphthalene with olefins, for example, propylene trimer or tetramer, or alkyl halides, with a suitable catalyst, e.g., hydrogen fluoride or anhydrous aluminum chloride in a suitable solvent such as naphtha, sulfur dioxide, nitrobenzene or a mixture of benzene and nitrobenzene. See Robert G. King and George W. Thielcke, U.S. Pat. No. 2,764,548, assigned to the assignee of the present invention. Such a process produces naphthalene substituted with alkyl groups and, if a branched olefin is used, such as propylene trimer or propylene tetramer, obtained by polymerizing propylene with an acid catalyst such as phosphoric acid, then the alkyl groups will be highly branched as well. Sulfonation is accomplished by treating the alkylaromatic compound with a sulfonating agent. For example, dinonylnaphthalene compound is dissolved in an inert solvent, such as petroleum naphtha, hexane, heptane, octane, chlorinated solvents, and the like, and sulfuric acid, preferably oleum, is introduced into the solution at the desired temperature and with agitation. After reaction is complete, the sulfonic acid is recovered by separating and drawing off a heavy spent sulfonic acid layer and then extracting the sulfonic acid water to remove polysulfonic acids and residual sulfonic acid. A detailed technique for preparing dinonylnaphthalene sulfonic acid, didodecylnaphthalene disulfonic acid and isomers and analogs thereof, including the benzene analogs, is described in the King et al. U.S. Pat. No. 2,764,548.

Alkanolamine compound A (ii) (and D, if used,) can vary widely in type. It will be of the general formula:

$$R_m-N-(R^1-OH)_n$$

wherein R is hydrogen or alkyl, preferably $C_1$–$C_8$ alkyl and $R^1$ is divalent alkylene, straight chain or branched, of from about 2 to about 30 carbon atoms, preferably from about 2 to 6 carbon atoms, and m is 0, 1 or 2 and n is 1 to 3, the total of m plus n being 3. Such alkanolamines comprise monoalkanolamines, dialkanolamines and trialkanolamines as well as mono- and dialkyl derivatives of the monoalkanol and dialkanolamines, respectively. These are generally readily available commercially and they can easily be made by well known procedures such as by the reaction of ammonia or a primary or secondary amine with an alkylene oxide. Illustrative alkanol amines are monoethanolamine, monopropanolamine, monoisopropanolamine, diethanolamine, dipropanolamine, triethanolamine, triisopropanolamine, dimethylethanolamine, diethylethanolamine, ethyldiethanolamine, n-hexyldiethanolamine, mixtures of any of the foregoing, and the like. Special mention is made of triethanolamine and diethylethanolamine.

Component (B), a half acid ester of an alkenyl succinic acid, can vary widely also in type and amount. Preferably, component (B) will comprise a half acid $C_1$–$C_8$ ester of a $C_8$–$C_{20}$ alkyl- or alkenylsuccinic acid. The $C_1$–$C_8$ group can for example be methyl, ethyl, isopropyl, n-hexyl, iso-octyl, mixtures of any of them, and the like. The alkenyl group can comprise decenyl, dodecenyl, tetradecenyl, tetrapropenyl, docosenyl groups, mixtures thereof and the like. Such compounds can be made by reacting the corresponding alkenylsuccinic anhydride with the corresponding alcohol in well known procedures. The alkyl succinic anhyrides can be made by hydrogenating the corresponding alkenylsuccinic anhydrides.

Component (C) will comprise an aqueous liquid diluent, especially a predominantly water-containing medium. Other water miscible compounds can also be present so long as they are inert, such as polyglycols, ketones, such as acetone, lower alcohols, such as ethanol and isopropanol, and the like.

To make the compositions, it is merely necessary to intimately blend the components. Preferably, however, a concentrate will first be prepared and this will be diluted. In one manner of proceeding, a preformed salt of the alkanol amine and the alkylaromatic sulfonic acid will be used in a diluent such as a polyglycol, and then water will be added in increments. If necessary, increments of an alkanolamine will also be added to maintain true solubility. Unlike a microemulsion, a true solution does not undergo the typical inversion behavior seen in true emulsions as the organic to aqueous ratio is varied. In essence, the compositions of the invention are miscible with water in all proportions to give clean, low viscosity composition. This will be shown in the examples which follow.

Protectively coated substrates can be prepared by conventional methods, such as by dipping and spraying. They dry tack-free in a relatively short time in an oven and overnight at room temperature. Corrosion resistance can be quantitatively measured by placing coated metal panels, e.g., steel panels, in a humidity and/or salt fog chamber and measuring the time required to develop observable pitting, rusting and the like. The coatings can be readily stripped in metal cleaning equipment using ordinary cleaners, such as alkaline sprays, naphtha solvents and the like.

DESCRIPTION OF THE PREFERRED EMBODIMENTS

The following examples illustrate the invention and compare the results with compositions not within the scope of the invention. The examples are not intended to limit the claims in any manner whatsoever.

COMPARATIVE EXAMPLE 1

Ten parts of the triethanolamine salt of dinonylnaphthalene sulfonic acid (50% by weight in polyglycol, NA-SUL® TEA-LB, King Industries, Inc.) is added to 90 parts of water to give a stable, slightly opalescent fluid. Application of this mixture to steel panels is made by dipping. The panels are dried overnight to produce oily film-coated surfaces. They are placed in an ASTM humidity chamber and corrosion failure is observed within 24 hours.

COMPARATIVE EXAMPLE 2

One part of NA-SUL® TEA-LB and 2 parts of Rhoplex® Rohm & Haas carboxy-functional acrylic copolymer emulsion are combined to give a typically milky emulsion. One part of the emulsion is diluted with 3 parts of water and applied by dip-coating to steel panels. Drying leaves a nearly tack-free but slightly grainy coating. After being placed in an ASTM humidity cabinet, the coated panels exhibit corrosion failure within one hour.

EXAMPLES 1-5

Fifteen parts of NA-SUL® TEA-LB plus 27 parts of the mono-methyl ester of dodecenyl succinic acid, 10.5 parts of diethylethanolamine and 5 parts of water are mixed to provide a clear fluid mixture, miscible with water in all proportions to give clear low viscosity solutions.

Thirty-five parts of the clear fluid mixture in 65 parts of water is used to dip-coat steel panels, which are then dried overnight. The coating is extremely thin, uniform, nearly invisible and tack-free. The dry coating is approximately 0.05 mils thick as determined by weighing control panels before and after stripping. The panels are placed in an ASTM chamber and show no rust or other evidence of corrosion for up to 15 days.

The procedure is repeated with 25, 16, 8 and 4 parts of the solution and corresponding amounts of water to make 100 parts by weight total. Panels are dip-coated, dried and exposed to humidity in an ASTM chamber. Even at levels as low as 4 parts, the coatings provide protection against corrosion for 5-6 days. The protective coating at 4 parts gives significant corrosion resistance even though the film is so thin that its thickness can not be measured by the weight differential method.

The coatings of these Examples 1-5 are all removable by dipping in a 1 percent solution of a commercial alkaline metal cleaner solution. The coatings are also readily stripped by using acetone, isopropanol and heptane.

COMPARATIVE EXAMPLES 3 AND 4

The general procedure of Example 1 is repeated with 10 parts of the calcium salt of dinonylnaphthalene sulfonic acid (50 percent by weight in light mineral oil, NA-SUL® 729, King Industries, Inc.) 30 parts of monomethyl ester or dodecenylsuccinic acid, 10 parts of diethylethanolamine and 0-80 parts of water. The mixture is not miscible with water because it is clear but grainy. Two parts of butylcarbitol do not eliminate the graininess. Two panels coated with a 50-50 mixture in water, dried overnight and exposed to ASTM humidity conditioning exhibit corrosion failure within 3 hours.

COMPARATIVE EXAMPLES 4 AND 5

Ten parts of an ammonium salt of dinonylnaphthalene sulfonic acid (50 percent by weight in light mineral oil, NA-SUL® AS, King Industries, Inc.), 20 parts of the monomethyl ester of dodecenylsuccinic acid and 5.5 parts of diethylethanolamine are mixed. Water is added. After 85 parts is added, a clear fluid mixture is obtained. More water (135 parts) however produces a turbid, viscous emulsion. This is cleared with 1 more parts of diethylethanolamine, then 100 parts of water is added and a hazy, viscous and non-newtonian mixture is obtained. This is evidence of an inverted emulsion, unsuitable for use as a clear coating. The substitution of a sodium salt for the ammonium salt also produces an inverted emulsion, unsuitable for use as a clear coating solution.

COMPARATIVE EXAMPLE 6

Twenty parts of NA-SUL® TEA-LB and 40 parts of ECR® 903 ($C_{12}$ aliphatic carboxylic acid) from Exxon and 14 parts of diethylethanolamine are mixed. Water is added in increments to phase inversion and increments of amine are added to clear to the solution. At 186 parts of added water an emulsion is formed and this is unsuitable for use as a clear coating composition.

The above-mentioned patents and test methods are incorporated herein by reference.

Many variations of this invention will suggest themselves to those skilled in this art in light of the above, detailed description. For example, instead of the triethanolamine salt of dinonylnaphthalenesulfonic acid, the ethanolamine salt of dodecylbenzene sulfonic acid can be used. Instead of water, the compositions can be diluted for application with a 60:40 w/w mixture of water and acetone. Instead of steel panels, aluminum panels and copper panels can be protectively coated with the compositions of this invention. The compositions of this invention can also be formulated with greases, such as bentone greases, and thereby provide corrosion resistant greases. All such obvious modifications are within the full intended scope of the appended claims.

I claim:

1. A composition dilutable in all proportions with water to form a true solution and adapted to form a clear corrosion-inhibiting coating on a metal substrate normally susceptible to corrosion, said composition consisting of either:
   (I)
   (A) a salt of
      (i) an alkylaromatic sulfonic acid and
      (ii) an alkanolamine;
   (B) a half acid ester of an alkyl- or alkenylsuccinic acid; and
   (C) an aqueous liquid diluent therefor; or,
   (II)
   (A) a salt of
      (i) an alkylaromatic sulfonic acid and
      (ii) an alkanolamine;
   (B) a half acid ester of an alkyl- or alkenylsuccinic acid;
   (C) an aqueous diluent therefore; and
   (D) "an effective amount of an alkanolamine which is the same or different from that defined for (A) (ii) to maintain miscibility of the composition.

2. A composition as defined in claim 1 wherein said aqueous liquid diluent (C) comprises water in a major proportion.

3. A composition as defined in claim 1 wherein component (i) comprises dinonylnaphthalene sulfonic acid, the nonyl radicals of which are highly branched.

4. A composition as defined in claim 1 wherein said component (ii) comprises a monoalkanolamine, a dialkanolamine, a trialkanolamine, or a mixture of any of the foregoing.

5. A composition as defined in claim 4 wherein said trialkanolamine (ii) comprises triethanolamine.

6. A composition as defined in claim 3 wherein said trialkanolamine (ii) is triethanolamine.

7. A composition as defined in claim 1 wherein said component (B) comprises a half acid $C_1$-$C_8$ ester of a $C_8$-$C_{20}$ alkyl- or alkenylsuccinic acid.

8. A composition as defined in claim 7 wherein said component (B) comprises a half acid methyl ester of dodecenylsuccinic acid.

9. A composition as defined in claim 1 wherein said component (D) is present and comprises a monoalkanolamine, a dialkanolamine, a trialkanolamine or a mixture of any of the foregoing.

10. A composition as defined in claim 9 wherein said component (D) comprises diethylethanolamine.

11. A composition as defined in claim 1 wherein components (A), (B) and (D) comprise from about 2 to about 95 parts by weight per 100 parts by weight of (A), (B), (C) and (D) combined.

12. A composition as defined in claim 11 wherein components (A), (B) and (D) comprise from about 4 to about 35 parts by weight per 100 parts by weight of (A), (B), (C) and (D) combined.

* * * * *